United States Patent
Jiang et al.

(10) Patent No.: US 11,852,779 B1
(45) Date of Patent: Dec. 26, 2023

(54) METHOD AND SYSTEM FOR MONITORING EXTRAORDINARY RAINSTORM ON BASIS OF MULTI-SOURCE DATA

(71) Applicant: Shandong University, Weihai (CN)

(72) Inventors: Nan Jiang, Weihai (CN); Yuhao Wu, Weihai (CN); Yan Xu, Weihai (CN); Tianhe Xu, Weihai (CN)

(73) Assignee: Shandong University, Weihai (CN)

( * ) Notice: Subject to any disclaimer, the term of this patent is extended or adjusted under 35 U.S.C. 154(b) by 0 days.

(21) Appl. No.: 18/343,452

(22) Filed: Jun. 28, 2023

(30) Foreign Application Priority Data

Jun. 29, 2022 (CN) .......................... 202210744670.9

(51) Int. Cl.
*G01W 1/10* (2006.01)
*G01W 1/00* (2006.01)

(52) U.S. Cl.
CPC ........ *G01W 1/10* (2013.01); *G01W 2001/006* (2013.01)

(58) Field of Classification Search
CPC .......................... G01W 1/10; G01W 2001/006
See application file for complete search history.

(56) References Cited

U.S. PATENT DOCUMENTS

2014/0201667 A1* 7/2014 Schoeberl ................ G09G 5/14
715/771

FOREIGN PATENT DOCUMENTS

CN 104700577 A * 6/2015 ............. G08B 21/10
CN 109507756 A * 3/2019 ............. G01S 19/14

OTHER PUBLICATIONS

Jingshu Tan, "Evaluating Precipitable Water Vapor Products From Fengyun-4A Meteorological Satellite Using Radiosonde, GNSS, and ERA5 Data"., IEEE Transactions on Geoscience and Remote Sensing, vol. 60, 2022, Article Sequence No. 4106512 Jan. 25, 2022 (Year: 2022).*

* cited by examiner

*Primary Examiner* — Yoshihisa Ishizuka
(74) *Attorney, Agent, or Firm* — Janeway Patent Law PLLC; John M. Janeway

(57) ABSTRACT

A method and system for monitoring an extraordinary rainstorm based on multi-source data is provided. The method includes: acquiring a current moment of a target region; dividing a target time period into n rain events by means of a time window; inverting precipitable water vapor within each rain event; acquiring an accumulated rainfall per m hours within each rain event; computing, according to precipitable water vapor and the accumulated rainfall per m hours within each rain event, a mutual conversion speed V between the precipitable water vapor and the accumulated rainfall; indicating, if the conversion speed is greater than or equal to 1, that a rainfall is excessive and the extraordinary rainstorm is going to occur after the current moment; and indicating, if the conversion speed is less than 1, the rainfall is insufficient and the extraordinary rainstorm is about to end.

6 Claims, 3 Drawing Sheets

```
┌─────────────────────────────────────────────┐
│ Acquire a current moment of a region to be   │
│ monitored, set a length of a time window and │
│ a sliding step size of the time window, and  │
│ divide into several rain events by means of  │
│ the time window                              │
└─────────────────────────────────────────────┘
                     │
                     ▼
┌─────────────────────────────────────────────┐
│ Invert precipitable water vapor within each  │
│ rain event                                   │
└─────────────────────────────────────────────┘
                     │
                     ▼
┌─────────────────────────────────────────────┐
│ Compute, according to precipitable water     │
│ vapor and the accumulated rainfall per m     │
│ hours within each rain event, a mutual       │
│ conversion speed between the precipitable    │
│ water vapor and the accumulated rainfall;    │
│ and predict whether an extraordinary         │
│ rainstorm will occur according to the mutual │
│ conversion speed                             │
└─────────────────────────────────────────────┘
```

FIG. 1

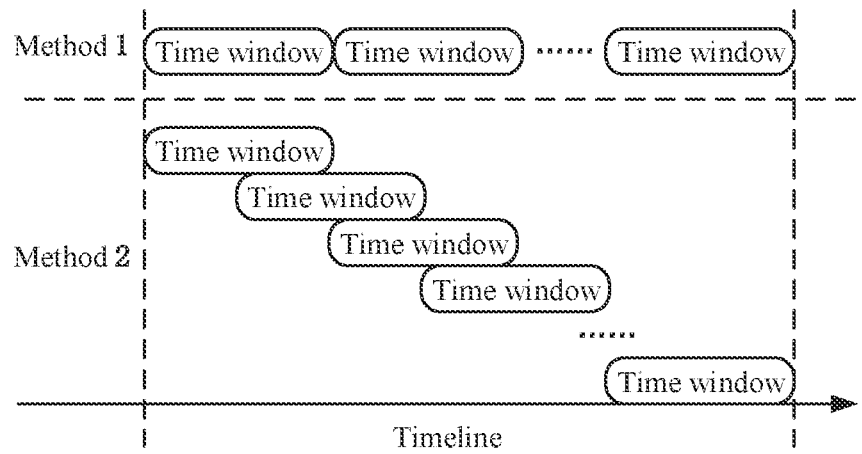

FIG. 2

METHOD AND SYSTEM FOR MONITORING EXTRAORDINARY RAINSTORM ON BASIS OF MULTI-SOURCE DATA

CROSS REFERENCE TO RELATED APPLICATION

This patent application claims the benefit and priority of Chinese Patent Application No. 202210744670.9 filed with the China National Intellectual Property Administration on Jun. 29, 2022, the disclosure of which is incorporated by reference herein in its entirety as part of the present application.

TECHNICAL FIELD

The present disclosure relates to the technical field of data processing for prediction, and particularly relates to a method and system for monitoring an extraordinary rainstorm based on multi-source data.

BACKGROUND

Statements in this section merely mention background art related to the present disclosure and do not certainly constitute the prior art.

Rainstorms cause geological disasters such as floods, debris flows and landslides, which severely threaten human life and property safety. The rainstorms occur in the case of sufficient, continuous transport of water vapor and violent vertical movement of atmosphere. Playing a vital role in climate regulation, the water vapor is a key factor in global atmospheric radiation, water cycle and energy balance. Its change is a main driving force of climate change. Precipitable water vapor (PWV) is defined as a total water vapor content per unit area of vertical column in the atmosphere. As one of the main forms of water vapor in the air, the precipitable water vapor affects occurrence and scale of rain. Analysis of a relation between an occurrence process of a rainstorm and PWV is of significance for early warning of extreme rainstorms and reduction of personal and property losses.

Traditional ground-based methods for detecting atmospheric water vapor, such as a radiosonde, have defects of low temporal resolution (twice a day), sparse distribution of stations, etc. Water vapor radiometers (WVRs) are not extensively used due to high price. Sun photometers are limited in term of rain monitoring on account of sparse distribution of stations and inability to provide data in cloudy weather. In recent years, some scholars have researched PWV inversed from near infrared, thermal infrared and microwave bands of space-based remote sensing. The space-based remote sensing overcomes the shortcoming of sparse distribution of ground-based stations, but infrared remote sensing cannot provide data in cloudy weather. Although microwave remote sensing can penetrate clouds, complex and changeable land surface parameters make PWV inversion difficult. In addition, the space-based remote sensing is relatively low in temporal resolution, which is generally twice a day in one place. In summary, the space-based remote sensing is limited in term of rain monitoring because of the above disadvantages. With merits of high temporal resolution, high accuracy and low cost, ground-based global navigation satellite system (GNSS) meteorology has become a new method for inverting precipitable water vapor. Compared with the other methods, a GNSS receiver can provide PWV with high temporal resolution when it rains.

As one of the main forms of water vapor in the air, the PWV is related to occurrence and scale of rain. Most of existing researches focus on analysis of a relation between ordinary rain and PWV, but few researches are made on analysis and monitoring of an extraordinary rainstorm according to PWV. Moreover, atmospheric temperatures and atmospheric pressures at observation stations are required when GNSS-PWV is inversed. In existing researches, the atmospheric temperatures and the atmospheric pressures are generally acquired according to reanalysis data or meteorological station data, but spatial differences introduced affect an inversion result. Further, real-time linkage between the reanalysis data and the meteorological station data and a GNSS station is relatively poor, so rain cannot be monitored in real time according to PWV. Rain is related to many factors. Most of the existing researches only qualitatively analyze a relation between PWV and rain, but do not quantify relations between PWV, atmospheric temperatures, atmospheric pressures and relative humidity and rain.

SUMMARY

In order to overcome deficiencies in the prior art, the present disclosure provides a method and system for monitoring an extraordinary rainstorm based on multi-source data. In the present disclosure, according to meteorological data and precipitable water vapor of the target region, whether an extraordinary rainstorm will occur in a target region can be accurately predicted, and a time period in which the extraordinary rainstorm occurs can be predicted.

In a first aspect, the present disclosure provides a method for monitoring an extraordinary rainstorm based on multi-source data.

The method includes:
acquiring a current moment of a target region; assuming that an initial monitoring moment of the target region is t1 and the current moment of the target region is t2; setting a length of a time window as L and a sliding step size of the time window as L2; and dividing a time period t2−t1 into n rain events by means of the time window; where n is a positive integer;

inverting precipitable water vapor within each rain event; and acquiring an accumulated rainfall per m hours within each rain event, where m is a positive integer; computing, according to precipitable water vapor and the accumulated rainfall per m hours within each rain event, a mutual conversion speed V between the precipitable water vapor and the accumulated rainfall; indicating, if the mutual conversion speed is greater than or equal to 1, that a rainfall is excessive and the extraordinary rainstorm is going to occur after the current moment; and indicating, if the mutual conversion speed is less than 1, the rainfall is insufficient and the extraordinary rainstorm is about to end.

In a second aspect, the present disclosure provides a system for monitoring an extraordinary rainstorm based on multi-source data.

The system includes:
an acquisition module configured to acquire a current moment of a target region; assume that an initial monitoring moment of the target region is t1 and the current moment of the target region is t2; set a length of a time window as L and a sliding step size of the time window as L/2; and divide a time period t2−t1 into n rain events by means of the time window, where n is a positive integer;

an inversion module configured to inverse precipitable water vapor within each rain event; and an extraordinary rainstorm occurrence prediction module configured to acquire an accumulated rainfall per m hours within each rain event, where m is a positive integer; compute, according to precipitable water vapor and the accumulated rainfall per m hours within each rain event, a mutual conversion speed V between the precipitable water vapor and the accumulated rainfall; indicate, if the mutual conversion speed is greater than or equal to 1, that a rainfall is excessive and the extraordinary rainstorm is going to occur after the current moment; and indicate, if the conversion speed is less than 1, the rainfall is insufficient and the extraordinary rainstorm is about to end.

Compared with the prior art, beneficial effects of the present disclosure are as follows.

A co-located meteorological sensor of a global navigation satellite system (GNSS) station is compared with a meteorological station and fifth generation european centre for medium-range weather forecasts atmospheric reanalysis of the global climate (ERA5) data, precipitable water vapor (PWV) is inversed according to observational data from a GNSS station and a co-located meteorological file, and an inversion result is verified according to the ERA5 data. Finally, detailed features of the PWV and various meteorological factors during an extraordinary rainstorm are revealed, and a theoretical basis is provided for extraordinary rainstorm early warning by means of a GNSS receiver and a co-located meteorological sensor thereof in the future. In the present disclosure, according to meteorological data and precipitable water vapor of the target region, whether the extraordinary rainstorm will occur in the target region can be accurately predicted, and a time period in which the extraordinary rainstorm occurs can be predicted.

BRIEF DESCRIPTION OF THE DRAWINGS

Accompanying drawings of the description constitute part of the present disclosure and serve to provide further understanding of the present disclosure, and illustrative embodiments of the present disclosure and the description of the illustrative embodiments serve to explain the present disclosure and are not to be construed as unduly limiting the present disclosure.

FIG. 1 is a flow diagram of a method according to Embodiment 1;

FIG. 2 shows schematic diagrams of methods for arranging time windows according to Embodiment 1;

DETAILED DESCRIPTION OF THE EMBODIMENTS

Figure 3A:
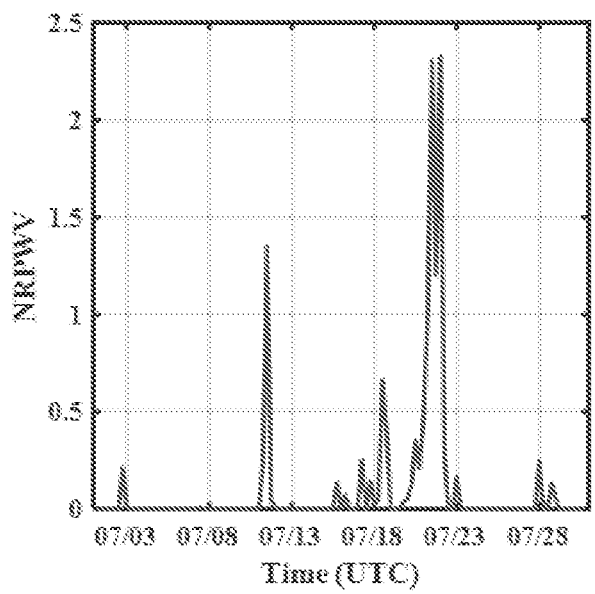
FIG. 3A shows a number of refills for precipitable water vapor (NRPWV) of an HAHB station computed using a precipitable water vapor (PWV) and a rainfall according to Embodiment 1.

It should be pointed out that the following detailed description is illustrative and is intended to provide further description of the present disclosure. All technical and scientific terms used herein have the same meaning as commonly understood by those of ordinary skill in the art to which the present disclosure belongs unless otherwise defined.

It should be noted that terms used herein are merely for describing particular implementations and are not intended to limit illustrative implementations according to the present disclosure. As used herein, unless the context clearly indicates otherwise, the singular form is also intended to include the plural form. Moreover, terms "include", "comprise" and "have" as well as their any variations are intended to cover non-exclusive inclusion, for example, a process, method, system, product or apparatus including a series of steps or units is not necessarily limited to those explicitly listed steps or units, but can include other steps or units not explicitly listed or inherent to the process, method, product or apparatus.

Embodiments of the present disclosure and features in the embodiments can be combined with each other without conflict.

In the embodiments, all data is acquired on the basis of compliance with laws and regulations and user consent, and is legally applied.

Term explanation: PWV: precipitable water vapor.

Most of existing researches focus on analysis of a relation between ordinary rain and PWV, but few researches are made on analysis of a PWV difference between an extraordinary rainstorm and ordinary rain. In addition, in the existing researches, PWV is inversed generally according to atmospheric temperatures and atmospheric pressures acquired from reanalysis data or meteorological station data. Interpolation of the reanalysis data and a spatial difference between a meteorological station and a global navigation satellite system (GNSS) station bring errors to an inversion result, and the reanalysis data requires a certain update period (for example, update time of single-layer hourly reanalysis data from ERA5 is often one week behind). Linkage between the meteorological station and the GNSS station is poor, so it is impossible to inverse the PWV in real time according to the data provided by the meteorological station and the GNSS station. Most researches only consider a single factor of PWV when analyzing a relation between PWV and rain, but rain is further related to other meteorological factors. Moreover, most researches only qualitatively analyze a relation between PWV and rain, but fail to quantify it. In view of this, according to the present disclosure, PWV is inversed according to observational data from a GNSS and data from a co-located meteorological sensor thereof, accuracy of the co-located meteorological sensor of a GNSS station is verified according to meteorological station data and ERA5 data before inversion, and change features of PWV, atmospheric temperatures, atmospheric pressures and relative humidity in a certain region during an extraordinary rainstorm are researched. All rain events in a certain region in a certain month are separated one by one, a PWV difference between ordinary rain and the extraordinary rainstorm is analyzed in detail, and a conversion rate between PWV and rain at each monitoring station in a region to be researched is computed. Correlations of PWV and various meteorological factors with rain are displayed in a time domain by overlapping time windows. Thus, theory and method for extraordinary rainstorm prediction merely by means of a GNSS station and a co-located meteorological sensor thereof in the future are provided.

Embodiment 1

The embodiment provides a method for monitoring an extraordinary rainstorm based on multi-source data.

As shown in FIG. 1, the method for monitoring an extraordinary rainstorm based on multi-source data includes the following steps S101-S103.

In S101, a current moment of a target region is acquired, an initial monitoring moment of the target region is assumed as t1 and the current moment of the target region is assumed as t2; a length of a time window is set as L and a sliding step size of the time window is set as L/2; and a time period t2−t1 is divided into n rain events by means of the time window, where n is a positive integer;

In S102, precipitable water vapor within each rain event is inverted.

In S103, an accumulated rainfall per m hours within each rain event is acquired, where m is a positive integer.

According to precipitable water vapor and the accumulated rainfall per m hours within each rain event, a mutual conversion speed V between the precipitable water vapor and the accumulated rainfall is computed.

If the mutual conversion speed is greater than or equal to 1, it indicates that a rainfall is excessive and the extraordinary rainstorm is going to occur after the current moment; and if the mutual conversion speed is less than 1, it indicates that the rainfall is insufficient and the extraordinary rainstorm is about to end.

Illustratively, a value of m is 6.

Illustratively, in S101, in order to quantitatively analyze correlations of GNSS PWV and various meteorological factors with rainfalls. In the present disclosure, correlation coefficients of PWV and various meteorological factors with rainfalls are computed by means of time windows in a segmented manner. FIG. 2 shows schematic diagrams of methods for arranging time windows. Generally, the time windows are configured through two methods, the first method is to isolatedly arrange time windows, and the second method is to arrange time windows to overlap each other by 50%. Considering that rain has strong continuity, the second method is selected.

Further, in S102, the inverting precipitable water vapor within each rain event specifically includes the following steps S1021-S1022.

In S1021, observational data and meteorological data collected by the global navigation satellite system in the target region are acquired.

In S1022, the precipitable water vapor is inverted according to the observational data and meteorological data.

Further, after acquiring observational data and meteorological data collected by the global navigation satellite system in the target region in S1021, and before inverting the precipitable water vapor according to the observational data and meteorological data in S1022, the method further includes the following steps S1021-2.

In S1021-2, accuracy verification is performed on the meteorological data collected by the global navigation satellite system.

Further, the performing accuracy verification on the meteorological data collected by the global navigation satellite system specifically includes the following steps S1021-21-S1021-25.

In S1021-21, data from a meteorological station is collected, and meteorological data for the meteorological station is obtained by performing elevation conversion on the data from the meteorological station.

In S1021-22, data from the fifth generation european centre for medium-range weather forecasts (ECMWF) atmospheric reanalysis of the global climate (ERA5) is collected, and meteorological data for the ERA5 and precipitable water vapor for the ERA5 is obtained by performing elevation conversion and bilinear interpolation on the data from the ERA5.

In S1021-23, a first difference between the meteorological data collected by the global navigation satellite system and the meteorological data for the meteorological station is computed.

In S1021-24, a second difference between the meteorological data collected by the global navigation satellite system and the meteorological data for the ERA5 is computed.

In S1021-25, if the first difference and the second difference are both within a predetermined range, it indicates that the meteorological data collected by the global navigation satellite system passes accuracy verification; and otherwise, it indicates that the meteorological data collected by the global navigation satellite system fails to pass accuracy verification, and data from the global navigation satellite system is recollected.

Illustratively, elevation systems of meteorological station data, ERA5 reanalysis data and GNSS data are different from each other, and are an altitude height, a geopotential height and a geodetic height, respectively. Therefore, the elevation systems are required to be unified before data processing, and in the present disclosure, various data is unified into the geodetic height by means of an EGM2008 model.

Elevation conversion formulas for PWV, atmospheric temperature and atmospheric pressure are as follows, respectively:

$$PWV_{h1} = PWV_{h2} \cdot \exp(-(h1-h2)/2000); \quad (1)$$

$$T_{h1} = T_{h2} + \Gamma \cdot (h1-h2); \quad (2)$$

$$P_{h1} = P_{h2}\left(\frac{T_{h1}}{T_{h2}}\right)^{\frac{g \cdot M}{R \cdot \Gamma}}; \quad (3)$$

where $PWV_{h1}$ and $PWV_{h2}$ are precipitable water vapors at heights h1 and h2, respectively. $T_{h1}$ and $T_{h2}$ are atmospheric temperatures at heights h1 and h2, respectively, and $\Gamma$ is a temperature lapse rate, and its value is generally −6.5 K/km. $P_{h1}$ and $P_{h2}$ are atmospheric pressures at heights h1 and h2, respectively, R=8.31432 N·m (mol·K)$^{-1}$ is an ideal atmospheric constant, M=0.0289655 kg·mol$^{-1}$ is molar mass of dry air, g is a gravity parameter, and a computational formula thereof is as follows:

$$g = 9.8063 \left\{1 - 10^{-7}\frac{h1+h2}{2}\left[1 - 0.0026373 \cdot \cos(2\varphi) + 5.9 \times 10^{-6} \cdot \cos(^22\varphi)\right]\right\}; \quad (4)$$

where φ is a latitude of an observation station.

In addition, a GNSS station generally does not coincide with grid points of ERA5 data. In the present disclosure, bilinear interpolation is performed on 4 grid points near the GNSS station to obtain ERA5 atmospheric temperature, atmospheric pressure and PWV data at the station.

Further, in S1022, the inverting the precipitable water vapor according to the observational data and meteorological data specifically includes the following steps S1022-1-S1022-5.

In S1022-1, the zenith tropospheric delay (ZTD) is obtained by processing the observational data collected by the global navigation satellite system through precise point positioning.

In S1022-2, the zenith hydrostatic delay (ZHD) is computed according to atmospheric pressure data in the meteorological data collected by the global navigation satellite system.

In S1022-3, the zenith wet delay (ZWD) is determined according to the zenith tropospheric delay and the zenith hydrostatic delay.

In S1022-4, a conversion coefficient is obtained according to atmospheric temperature data in the meteorological data collected by the global navigation satellite system.

In S1022-5, first precipitable water vapor is obtained according to the zenith wet delay and the conversion coefficient.

Illustratively, the zenith tropospheric delay is solved through precise point positioning (PPP).

The ZTD is composed of the zenith wet delay and the zenith hydrostatic delay, in which ZHD, which accounts for 90%, can be accurately computed by means of the Saastamoinen model, and ZWD, which accounts for 10%, can be obtained by subtracting the ZHD from the ZTD.

A computational formula for the ZHD is as follows:

$$ZHD = \frac{0.0022768 \times P}{1 - 0.00266\cos 2\varphi - 0.00028H}; \quad (5)$$

where P is an atmospheric pressure in hPa at an observation station, $\varphi$ is a latitude of the observation station, and H is an altitude in km of the observation station.

A computational formula for the ZWD is as follows:

$$ZWD = ZTD - ZHD \quad (6)$$

The ZWD is converted to PWV by being multiplied by a dimensionless conversion coefficient n, of which a computational formula is as follows:

$$\Pi = \frac{10^5}{R_v \times [k_3/T_m + k'_2]}; \quad (7)$$

where $R_v$ is a specific gas constant of water vapor, $R_v$=461 (J·kg$^{-1}$·k$^{-1}$), $k_2'$ and $k_3$ are atmospheric refractive index constants, $k_2'$=71.98 (K·hPa$^{-1}$), $k_3$=3.754×10$^5$ (K·hPa$^{-1}$), $T_m$ is an atmospheric weighted average temperature, $T_m$ is computed by means of the Bevis model in the present disclosure, and a formula thereof is as follows:

$$T_m = 70.2 + 0.72 T_s; \quad (8)$$

where $T_s$ is an atmospheric temperature at an earth surface.

After $\Pi$ and ZWD are computed, PWV is finally computed according to an equation as follows:

$$PWV = \Pi \times ZWD \quad (9)$$

Further, after inverting the precipitable water vapor according to the observational data and meteorological data in S1022, the method further includes the following step S1023.

In S1023, accuracy verification is performed on the inversed precipitable water vapor.

Accuracy of meteorological data is verified, and rain is preliminarily analyzed. Accuracy of a meteorological file and ERA5 data is verified by taking a ground meteorological station as a true value, and changes of atmospheric temperatures, atmospheric pressures and relative humidity with rainfalls are analyzed.

Further, in S1023, the performing accuracy verification on the inversed precipitable water vapor specifically includes the following steps S1023-1-S1023-2.

In S1023-1, a difference between the precipitable water vapor for the ERA5 and the first precipitable water vapor is computed.

In S1023-2, it is determined whether the difference between the precipitable water vapor for the ERA5 and the first precipitable water vapor is within a predetermined range, if so, it indicates that the first precipitable water vapor passes accuracy verification; and if not, it indicates that the first precipitable water vapor fails to pass accuracy verification.

Further, in S103, computing, according to precipitable water vapor and the accumulated rainfall per m hours within each rain event, a mutual conversion speed V between the precipitable water vapor and the accumulated rainfall specifically includes as follows.

The mutual conversion speed V between the PWV and rain is measured according to a number of refills for PWV (NRPWV), where a computational formula is as follows:

$$NRPWV = \frac{PRE}{\frac{1}{n} \cdot \sum_{i=1}^{n} PWV_i}; \quad (10)$$

where n is a number of PWVs in a set time period, and PRE is a total rainfall in a set time period.

Further, the method further includes the following step S104.

In S104, based on inversed precipitable water vapor, a time period in which the extraordinary rainstorm occurs is predicted.

Further, predicting, based on inversed precipitable water vapor within each rain event, a time period in which the extraordinary rainstorm occurs in S104 specifically includes the following steps S1041-S1044.

In S1041, it is determined whether the precipitable water vapor within each rain event is greater than a set threshold; if so, the method proceeds to S1042.

In S1042, it is determined, in two adjacent rain events, whether a difference between the precipitable water vapor for a later rain event and the precipitable water vapor for a previous rain event is greater than 0; if so, the method proceeds to S1043.

In S1043, it is determined whether a change speed of the precipitable water vapor of the rain events is less than a set threshold; if so, the method proceeds to S1044.

In S1044, it is determined, in two subsequent adjacent rain events, whether a difference between the precipitable water vapor for a later rain event and the precipitable water vapor for a previous rain event is less than 0; and if so, a moment corresponding to a peak value of the precipitable water vapor for the rain events is found out, several subsequent hours from the moment corresponding to the peak value of the precipitable water vapor are outputted as a prediction time period in which the extraordinary rainstorm (a rainfall of which is greater than 250 mm within 24 hours) occurs, and an early warning signal is sent.

According to the present disclosure, it is provided a method for monitoring an extraordinary rainstorm according to PV and other meteorological factors based on GNSS data, a co-located meteorological sensor thereof, meteorological station data and ERA5 data, and the method is verified with an extraordinary rainstorm in a certain region as a computational example. Finally, in the present disclosure, temporal and spatial change features of PWV during an extraordinary rainstorm are analyzed by combining GNSS PWV and ERA5 PWV.

Table I shows detailed information of various data, and a time range of the data is July 1 to July 30 of a certain year. The meteorological station data includes actually measured atmospheric temperature, atmospheric pressure and rainfall data, a temporal resolution is 3 hours, and a recording period of a rainfall is 6 hours. In order to avoid repeated use of data, the rainfall data is downsampled to 6 hours.

TABLE 1

Detailed information of each dataset

| Data set | Spatial resolution | Temporal resolution |
| --- | --- | --- |
| GNSS data | 4 stations | 30 seconds |
| Meteorological station data | 9 stations | 3 hours |
| ERA5 Reanalysis data | 0.25° × 0.25° | 1 hour |

In order to reduce a spatial difference in a horizontal direction, a meteorological station nearest to a GNSS station is selected for analysis, and pairing relations of stations are HAHB-ANYANG, HAJY-MENGJIN, ZHNZ-XINZHENG and HAQS-ZHUMADIAN. ERA5 reanalysis data used includes atmospheric temperature, atmospheric pressure, PWV and rainfall data at the surface layer, and relative humidity data at the 1000-hPa layer.

Atmospheric temperature and atmospheric pressure are two essential factors for inverting PWV, such that it is required to analyze accuracy thereof first. The HAJY station, the HAHB station and the ZHNZ station are equipped with meteorological sensors and have meteorological files. Accuracy of ERA5 data and the meteorological files is analyzed, and then PWV is inversed by means of the meteorological files. In the case of the HAQS station, PWV is inversed according to the meteorological data from ERA5.

Results show that in days before an extraordinary rainstorm (on 21st of a certain month), at the four stations, atmospheric temperatures suddenly drop, daily temperature differences decrease, atmospheric pressures change, relative humidity increases and daily relative humidity differences decrease. During a period from 19th of a certain month to 23rd of this month, a rain concentration degree is relatively high. For the HAHB station, the HAJY station and the ZHNZ station, temperatures slightly fluctuate around 23° C., daily temperature differences are within 5° C., atmospheric pressures slightly fluctuate around 1001 hPa, 974 hPa and 955 hPa, respectively, relative humidity slightly fluctuates around 90%, and daily relative humidity differences are within 10%. Since the HAQS station is located far away from a severely afflicted region of an extraordinary rainstorm, the rainfall is relatively small, and fluctuation features of the atmospheric temperature, atmospheric pressure and relative humidity are obviously different from that of the other three stations.

The atmospheric temperature in the meteorological file of the HAJY station is large, and a root mean square error (RMSE) reaches 2.763° C., which indicates that there is a certain deviation in a temperature sensor. The atmospheric pressure of the XINZHENG meteorological station near the ZHNZ station is greater than that of ERA5 data and the GNSS meteorological file, and RMSEs of the ERA5 data and the GNSS meteorological file are 4.566 hPa and 3.6538 hPa, respectively. The reason is that the geodetic height of this meteorological station is quite different from the ERA5 geodetic height and the GNSS geodetic height after elevation datum conversion, and an error is introduced after elevation conversion. However, on the whole, the ERA5 data and the GNSS meteorological file have desirable accuracy, satisfy meteorological application requirements, and can be used for inverting PWV. Considering that the GNSS meteorological file has relatively high temporal resolution and a less spatial difference, in the present disclosure, PWV is inversed according to meteorological data.

The PWV inversion accuracies of the four observation stations are between 2.8 mm-4.2 mm. In order to describe changes of PWV during rain of the four stations in more detail, rain events of each station are divided according to interval time of rain, and detailed changes of a total rainfall and PWV in each rain event of the four stations are counted.

Typically, PWV continues to rise to a peak value before ordinary rain, and rapidly decreases when rain begins. However, in the present disclosure, it is found that PWV in a certain region during an extraordinary rainstorm has a different phenomenon, that is, the PWV has a "power storage" period one week before the extraordinary rainstorm, the PWV will continuously and slowly rises in a high value region in this period, the extraordinary rainstorm occurs within a few hours after a peak value is achieved, and then the PWV decreases. An extraordinary rainstorm can be predicted and monitored according to PWV change features.

There are 6 concentrated rain events in the HAQS station and 5 in other stations. Since the HAQS station is not in a severely afflicted region of an extraordinary rainstorm, the rain events are different from those in the other stations. The rainstorm corresponds to events A4, B4 and C4. Compared with other events, duration of this event is longer, rain is more concentrated, and a total rainfall is higher. The PWV of this period slowly rises from a high value to a maximum value, and then slowly drops to a low value, showing the features of "coming slowly and going slowly". In other ordinary rain events, the rainfall is relatively small, and the PWV rapidly reaches a maximum value in a short time, and then rapidly decreases, showing the features of "coming fast and going fast".

Figure 3B:
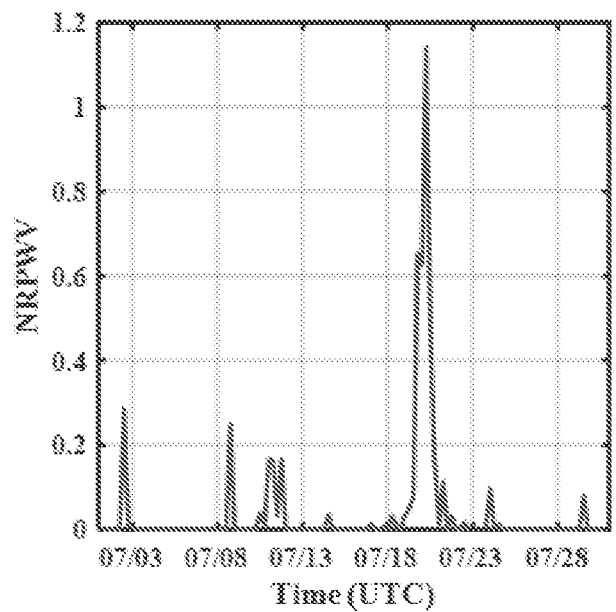
FIG. 3B shows an NRPWV of an HAJY station computed using PWV and a rainfall according to Embodiment 1.
Figure 3C:
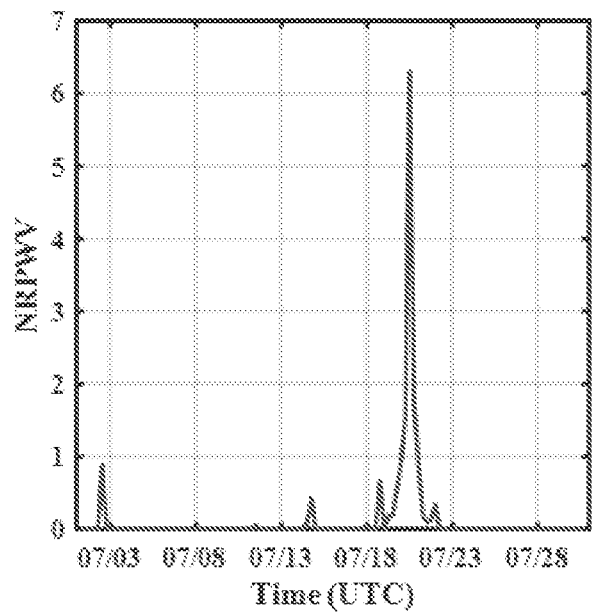
FIG. 3C shows an NRPWV of a ZHNZ station computed using PWV and a rainfall according to Embodiment 1.
Figure 3D:
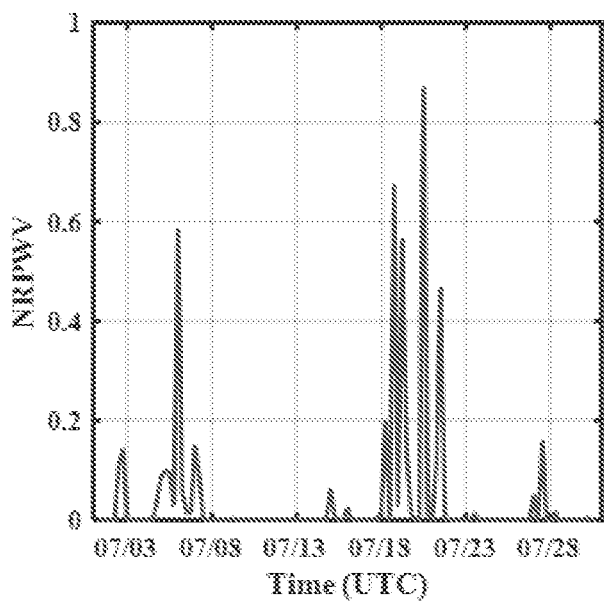
FIG. 3D shows an NRPWV of an HAQS station computed using PWV and a rainfall according to Embodiment 1.

Mutual conversion features between PWV and rain: in order to describe a conversion rate between PWV and a rainfall during a rainstorm, NRPWV is computed for four stations according to the PWV and the rainfall, and FIGS. 3A-3D are obtained.

Results show that the NRPWV of the HAHB station is more than 2 during an extraordinary rainstorm on 20th of a certain month, which indicates that a number of refills for PWV within 6 hours is more than 2 during an extraordinary rainstorm, is 1.3 during an ordinary rainstorm on 12th of a certain month, and is less than 1 during ordinary light rain. The NRPWV of the HAJY station is more than 1 during an extraordinary rainstorm on 21st of a certain month, which indicates that a number of refills for PWV within 6 hours is 1 during an extraordinary rainstorm, and a number of refills for PWV within 6 hours is less than 0.3 during other ordinary light rain. The NRPWV at the ZHNZ station reaches 6.2 during an extraordinary rainstorm on 21st of a certain month, which indicates that a number of refills for PWV within 6 hours is 6.2; and a PWV refill rate is less than 1 time/6 hours at the HAQS station in a non-severely-afflicted region during rain. By observing results of the four stations, PWV is rapidly converted into rain during an extraordinary rainstorm, and then it is required to carry out PWV refill. External PWV is continuously transmitted to the ZHNZ station located in a severely afflicted region at a speed of 6.2 times per 6 hours, so as to complete the extraordinary rainstorm.

Correlation analysis between each factor and a rainfall: with 18 h, 30 h, 42 h and 54 h as time windows, influences of different time window sizes on correlation coefficients are compared. Results show that a correlation coefficient between PWV and rain is generally greater than 0, the temperature is generally lower than 0, an atmospheric pressure is distributed on two sides of 0, relative humidity is generally greater than 0, and fluctuation intensity of a correlation coefficient decreases with addition of time windows. Therefore, PWV and relative humidity are positively correlated with a rainfall, temperature is negatively correlated with a rainfall, and atmospheric pressure is not significantly correlated with a rainfall. With an increase in a time window, stability of a correlation coefficient becomes greater, correlation coefficients of four stations show consistency, and this feature may be used to predict rain.

In the cases of spatial changes of PWV during an extraordinary rainstorm, a descending order of altitudes of four stations is ZHNZ>HAJY>HAQS>HAHB. Results show that the PWV of the HAQS station and the HAHB station is higher due to lower altitudes, while the PWV of the ZHNZ station and the HAJY station is lower due to higher altitudes. At 6:00 on 20th of a certain month, a rainfall of the HAJY station reaches a peak value (77 mm), and at this time, the PWV at the HAN station is also near a maximum value of 60 mm. After 6 hours, a rainfall at the ZHNZ station reaches a peak value (374 mm), and the PWV also reaches a peak value (68 mm) 3 hours before this moment. After the rainfall at the ZHNZ station reaches the peak value for 24 hours, the rainfall at the HAHB station also reaches a peak value (152 mm), and PWV also reaches a peak value (70 mm) 3 hours before this moment. The peak value of the rainfall at the HAHB station lags one day behind that at the ZHNZ station, and the corresponding peak value of PWV also lags one day behind.

Key points of the present disclosure are a strategy for monitoring an extraordinary rainstorm according to the GNSS and other multi-source data, a method for analyzing an extraordinary rainstorm according to the multi-source data, and a whole process for analyzing a relation between PWV and various meteorological factors and an extraordinary rainstorm.

Embodiment 2

The embodiment provides a system for monitoring an extraordinary rainstorm based on multi-source data.

The system includes an acquisition module, an inversion module, and an extraordinary rainstorm occurrence prediction module.

The acquisition module is configured to acquire a current moment of a target region; assume that an initial monitoring moment of the target region is t1 and the current moment of the target region is t2; set a length of a time window as L and a sliding step size of the time window as L/2; and divide a time period t2−t1 into n rain events by means of the time window, where n is a positive integer.

The inversion module is configured to inverse precipitable water vapor within each rain event.

The extraordinary rainstorm occurrence prediction module is configured to acquire an accumulated rainfall per m hours within each rain event, where m is a positive integer; compute, according to the precipitable water vapor and the accumulated rainfall per m hours within each rain event, a mutual conversion speed V between the precipitable water vapor and the accumulated rainfall; indicate, if the mutual conversion speed is greater than or equal to 1, that a rainfall is excessive and the extraordinary rainstorm is going to occur after the current moment; and indicate, if the conversion speed is less than 1, the rainfall is insufficient and the extraordinary rainstorm is about to end.

It should be noted herein that the above acquisition module, inversion module, extraordinary rainstorm occurrence prediction module correspond to steps S101 to S103 in Embodiment 1, and examples and application scenarios implemented in the above modules are the same as those implemented in the corresponding steps, but are not limited to the content disclosed in Embodiment 1. It should be noted that the above modules as part of a system can be executed in a computer system, such as a set of computer executable instructions.

In the above embodiments, descriptions of various embodiments are emphasized on their respective aspects, and for portions of a certain embodiment that are not described in detail, reference can be made to the associated descriptions of other embodiments.

What are described above are merely preferred embodiments of the present disclosure and are not intended to limit the present disclosure, and for those skilled in the art, the present disclosure can be variously modified and changed. Any modification, equivalent substitution, improvement, etc. within the spirit and principles of the present disclosure shall fall within the scope of protection of the present disclosure.

What is claimed is:

1. A method for monitoring an extraordinary rainstorm based on multi-source data, comprising:
   acquiring a current moment of a target region; assuming that an initial monitoring moment of the target region is t1 and the current moment of the target region is t2; setting a length of a time window as L and a sliding step size of the time window as L/2; and dividing a time period t2−t1 into n rain events by means of the time window, wherein n is a positive integer;
   inverting precipitable water vapor (PWV) within each rain event; wherein
   the inverting precipitable water vapor within each rain event comprises:
   acquiring observational data and meteorological data collected by a global navigation satellite system in the target region; performing accuracy verification on the meteorological data collected by the global navigation satellite system;
   and inverting the precipitable water vapor according to the observational data and the meteorological data; wherein
   the performing accuracy verification on the meteorological data collected by the global navigation satellite system comprises:
   collecting data from a meteorological station, and obtaining meteorological data for the meteorological station by performing elevation conversion on the data from the meteorological station;
   collecting data from the fifth generation european centre for medium-range weather forecasts atmospheric reanalysis of the global climate (ERA5), and obtaining meteorological data and precipitable water vapor for the ERA5 by performing elevation conversion and bilinear interpolation on the data from the ERA5;

computing a first difference between the meteorological data collected by the global navigation satellite system and the meteorological data for the meteorological station;

computing a second difference between the meteorological data collected by the global navigation satellite system and the meteorological data for the ERA5;

indicating, if the first difference and the second difference are both within a predetermined range, that the meteorological data collected by the global navigation satellite system passes accuracy verification; and otherwise, indicating that the meteorological data collected by the global navigation satellite system fails to pass accuracy verification, and recollecting data from the global navigation satellite system;

acquiring an accumulated rainfall per m hours within each rain event, wherein m is a positive integer; computing, according to precipitable water vapor and the accumulated rainfall per m hours within each rain event, a mutual conversion speed V between the precipitable water vapor and the accumulated rainfall; indicating, if the mutual conversion speed is greater than or equal to 1, that a rainfall is excessive and the extraordinary rainstorm is going to occur after the current moment; and indicating, if the mutual conversion speed is less than 1, the rainfall is insufficient and the extraordinary rainstorm is about to end; wherein the computing, according to precipitable water vapor and the accumulated rainfall per m hours within each rain event, a mutual conversion speed V between the precipitable water vapor and the accumulated rainfall comprises:

measuring the mutual conversion speed V between the PWV and the rainfall according to a number of refills for PWV (NRPWV), which is calculated as follows:

$$NRPWV = \frac{PRE}{\frac{1}{n} \cdot \sum_{i=1}^{n} PWV_i}; \quad (10)$$

wherein n is a number of PVWs in a predetermined time period, and PRE is a total rainfall in the predetermined time period.

2. The method according to claim 1, wherein the inverting the precipitable water vapor according to the observational data and the meteorological data comprises:

obtaining a zenith tropospheric delay by processing the observational data collected by the global navigation satellite system through precise point positioning;

computing a zenith hydrostatic delay according to atmospheric pressure data in the meteorological data collected by the global navigation satellite system;

determining a zenith wet delay according to the zenith tropospheric delay and the zenith hydrostatic delay;

obtaining a conversion coefficient according to atmospheric temperature data in the meteorological data collected by the global navigation satellite system; and obtaining first precipitable water vapor according to the zenith wet delay and the conversion coefficient.

3. The method according to claim 2, wherein after the inverting the precipitable water vapor according to the observational data and the meteorological data, the method further comprises:

performing accuracy verification on inversed precipitable water vapor.

4. The method according to claim 3, wherein the performing accuracy verification on inversed precipitable water vapor comprises:

computing a difference between the precipitable water vapor for the ERA5 and the first precipitable water vapor; and determining whether the difference between the precipitable water vapor for the ERA5 and the first precipitable water vapor is within a predetermined range, if so, indicating that the first precipitable water vapor passes accuracy verification; and if not, indicating that the first precipitable water vapor fails to pass accuracy verification.

5. The method according to claim 1, further comprising:

predicting, based on inversed precipitable water vapor, a time period in which the extraordinary rainstorm occurs; wherein the predicting, based on inversed precipitable water vapor within each rain event, a time period in which the extraordinary rainstorm occurs comprises:

determining whether the precipitable water vapor within each rain event is greater than a predetermined threshold; if so, proceeding to a next step;

determining, in two adjacent rain events, whether a difference between precipitable water vapor for a later rain event and precipitable water vapor for a previous rain event is greater than 0; if so, proceeding to a next step;

determining whether a change speed of the precipitable water vapor of the rain events is less than a predetermined threshold; if so, proceeding to a next step;

determining, in two subsequent adjacent rain events, whether a difference between precipitable water vapor for a later rain event and precipitable water vapor for a previous rain event is less than 0; and if so, finding out a moment corresponding to a peak value of the precipitable water vapor of the rain events, outputting several subsequent hours from the moment corresponding to the peak value of the precipitable water vapor as a prediction time period in which the extraordinary rainstorm occurs, and sending out an early warning signal.

6. A system for monitoring an extraordinary rainstorm based on multi-source data using the method according to claim 1, comprising:

an acquisition module configured to acquire the current moment of the target region; assume that the initial monitoring moment of the target region is t1 and the current moment of the target region is t2; set the length of the time window as L and the sliding step size of the time window as L/2; and divide the time period t2–t1 into n rain events by means of the time window;

an inversion module configured to inverse the precipitable water vapor within each rain event;

an extraordinary rainstorm occurrence prediction module configured to acquire the accumulated rainfall per m hours within each rain event, wherein m is the positive integer; compute, according to the precipitable water vapor and the accumulated rainfall per m hours within each rain event, the mutual conversion speed V between the precipitable water vapor and the accumulated rainfall; indicate, if the mutual conversion speed is greater than or equal to 1, that the rainfall is excessive and the extraordinary rainstorm is going to occur after the current moment; and indicate, if the conversion speed is less than 1, the rainfall is insufficient and the extraordinary rainstorm is about to end.

* * * * *